Patented Apr. 5, 1927.

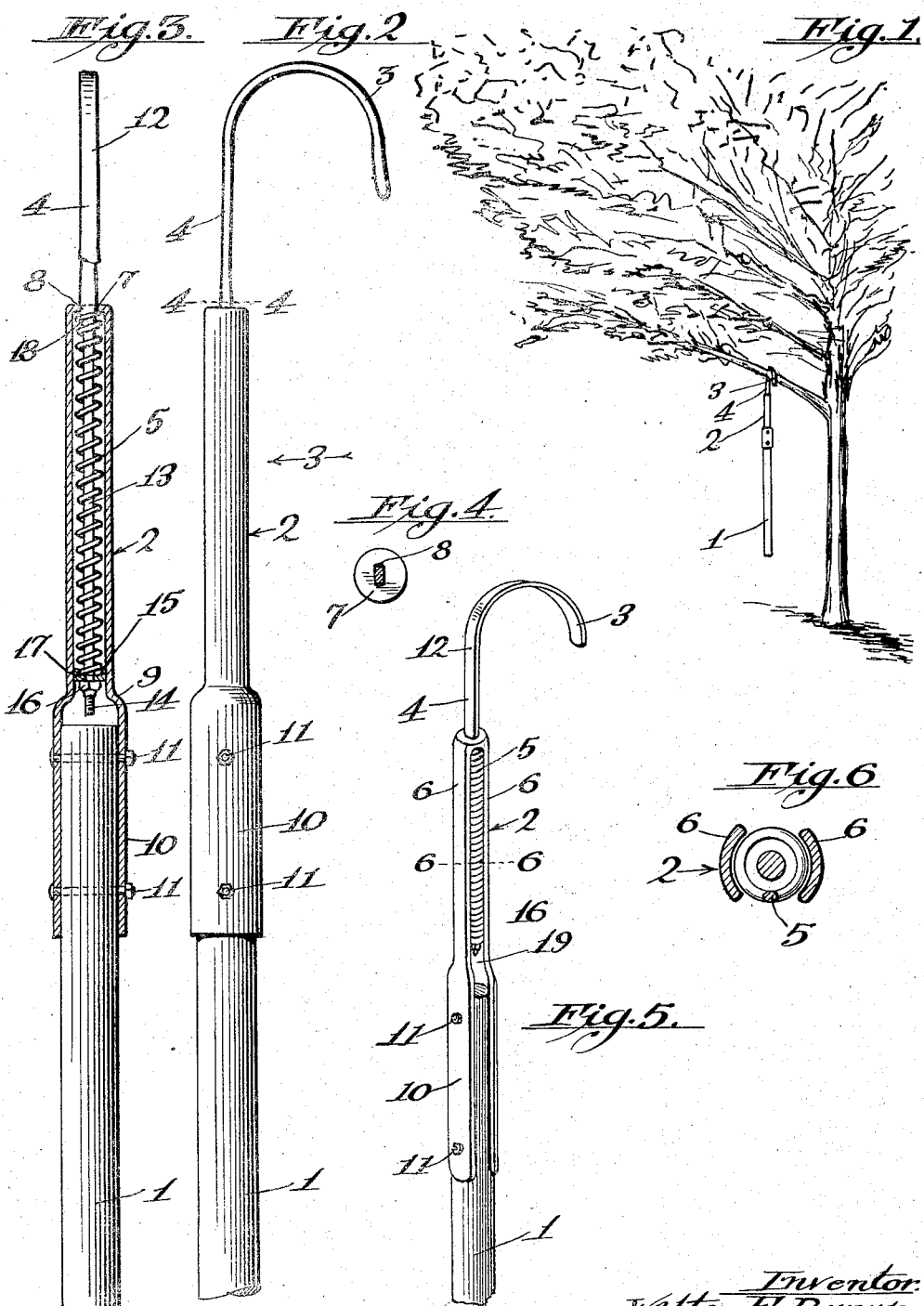

1,623,497

UNITED STATES PATENT OFFICE.

WALTER F. RURUP, OF SANTA ANA, CALIFORNIA.

TREE-SHAKING DEVICE.

Application filed December 9, 1925. Serial No. 74,278.

My invention is a tree shaking device adapted to be utilized to engage the limbs of a tree to shake such limbs.

An object of my invention is a tree shaking device particularly for use in shaking the limbs of nut bearing trees, to shake down the nuts, and constructed in such a manner to be adapted to engage the high as well as the low branches.

Another object of my invention is to form the tree shaking device with a resilient mounting thereby preventing injury to the bark of the branch or limb and eliminating the danger of pulling the branch off the tree or breaking the branch by a two vigorous shaking.

My tree shaking device comprises a handle rod having a socket at its upper end in which the stem of a hook may slide and a compression spring is engaged between the socket and part of the stem, this spring naturally retracting the stem but allowing outward movement of the stem when the hook engages a rim or branch of the tree and the rod is pulled.

My invention will be more readily understood from the following description and drawings, in which;

Figure 1 is a perspective view of my tree shaking device indicated as being hooked over a branch of a tree.

Fig. 2 is an elevation of the tree shaking device.

Fig. 3 is an elevation taken in the direction of the arrow 3 of Fig. 2, shown partly in section.

Fig. 4 is a cross section on the line 4—4 of Fig. 2.

Fig. 5 is a perspective detail illustrating the socket, the hook with the sliding stem and the connection of the socket to the handle rod.

Fig. 6 is a cross sectional detail on the line 6—6 of Fig. 5.

My tree shaking device comprises in brief a handle rod 1, a socket 2 attached to the handle rod, a hook 3 having a stem 4, slidably mounted in the socket with a compression spring 5 in the socket.

The manner of use of the device is substantially as follows:

The hook would be linked over a branch that it is desired to shake and when pulling on the rod the stem slides out of the socket, compressing the spring, thereby giving a resiliency to the pull on the branch and reducing to a great extent the danger of a person pulling the branch off the tree or breaking the branch or breaking one branch from another. The resilient connection of the hook to the handle rod also reduces the danger of injuring the bark of the tree, which injury would be of considerable detriment. As the handle rod can be made of considerable length, a person can reach to high branches of the tree.

The specific details of my tree shaking device are substantially as follows:

The handle rod 1 is preferably round and the socket 2 has two curved side straps 6 joined together at their upper end by a web 7, this web having a slot 8 therethrough. The lower end of the socket has offset sections 9 and depending ends 10 curved to fit the handle rod, these ends being secured to the handle by bolts 11. It will thus be seen that the socket is rigidly connected to the handle.

The hook 3 is flattened as indicated by the numeral 12 so as to have a considerable area to engage the branches. The stem section 4 is preferably rounded in its lower portion as indicated by the numeral 13 and has a screw threaded end 14. A washer 15 is loosely mounted on the stem and is secured in position by an adjusting nut 16. The spring 5 is thus tensioned between the washer as indicated by the numeral 17 and the web 7 as indicated by the numeral 18. I prefer to have the side straps spaced apart sufficiently, leaving an opening 19 so that the nut 16 may be readily actuated to increase or decrease the compression of the spring or to allow removal of the spring and substitution of different springs.

It will therefore be seen that the resiliency of my tree shaking device may be readily changed in that it may be made stiffer by compressing the spring by threading in the nut or made looser by threading the nut outwardly. Therefore it may be readily accommodated to the shaking of stiff or flexible branches of trees. Moreover, the springs if desired, may be readily changed in order to adapt the device for shaking different types of branches so that a spring of the proper resiliency may be utilized. Thus with the proper use of my tree shaking device the danger of breaking off limbs or of injury to the bark of the various limbs and branches being shaken is materially reduced and practically eliminated.

Although my invention is of a very simple character, it will be understood that it may be changed in general construction or in specific details to be adapted to different types of devices and for utilization in a different manner. Such changes will be within the spirit of my invention as set forth in the description, drawings and claim.

Having described my invention, what I claim is:

A tree shaking device comprising in combination a rod, a socket formed of parallel curved side straps, the straps being spaced apart at their edges, the side straps having depending offset ends, the rod being secured to the said ends, leaving a wide space adjacent the offset part of the side straps, the socket having a web at the other end of the straps with an aperture therethrough, a hook having a straight stem extending through the aperture and between the side straps, a washer slidably engaging the side straps and encircling the stem, a nut screw threaded on the end of the stem and a compression spring between the washer and the web.

In testimony whereof I have signed my name to this specification.

WALTER F. RURUP.